(12) United States Patent
Smith

(10) Patent No.: US 6,663,129 B1
(45) Date of Patent: Dec. 16, 2003

(54) MOTORCYCLE PIVOTING FOOT PEGS

(75) Inventor: Allen John Colvin Smith, Devonport (AU)

(73) Assignee: Technical Edge Pty. Limited, Devonport (AU)

( * ) Notice: Subject to any disclaimer, the term of this patent is extended or adjusted under 35 U.S.C. 154(b) by 0 days.

(21) Appl. No.: 09/787,687

(22) PCT Filed: Sep. 21, 1999

(86) PCT No.: PCT/AU99/00796

§ 371 (c)(1),
(2), (4) Date: May 8, 2001

(87) PCT Pub. No.: WO00/17038

PCT Pub. Date: Mar. 30, 2000

(30) Foreign Application Priority Data

Sep. 21, 1998 (AU) .............................................. PP 6048

(51) Int. Cl.[7] .................................................. B62H 1/08
(52) U.S. Cl. ........................ 280/291; 280/288.4; 74/564
(58) Field of Search ................................ 280/291, 163, 280/288.4, 294, 297, 265; 74/164, 564; 296/75; 24/339, 292, 297

(56) References Cited

U.S. PATENT DOCUMENTS

| | | | | |
|---|---|---|---|---|
| 374,287 A | * | 12/1887 | Benfield | ..................... 280/291 |
| 499,549 A | * | 6/1893 | Hunter | ........................ 24/339 |
| 4,458,910 A | | 7/1984 | Stillwagon | |
| 4,546,993 A | * | 10/1985 | Walker | ....................... 280/291 |
| 5,454,580 A | * | 10/1995 | Lin | ............................. 280/291 |
| 5,482,307 A | | 1/1996 | Lin | |
| 5,638,723 A | * | 6/1997 | Lin | ............................. 280/291 |
| 5,826,900 A | * | 10/1998 | Steele | ......................... 280/291 |
| 6,003,407 A | * | 12/1999 | Cavalier | .................... 74/594.1 |
| 6,070,897 A | * | 6/2000 | Hsieh et al. | ................. 280/291 |
| 6,161,859 A | * | 12/2000 | Cheng | ........................ 280/291 |

FOREIGN PATENT DOCUMENTS

| | | | | |
|---|---|---|---|---|
| GB | 166414 A | | 7/1921 | |
| GB | 223326 | | 10/1924 | |
| GB | 276167 A | | 8/1927 | |
| JP | 3248982 | * | 11/1991 | ................. 280/291 |
| JP | 10119857 | * | 5/1998 | ................. 296/75 |

* cited by examiner

*Primary Examiner*—Brian L. Johnson
*Assistant Examiner*—Hau Phan
(74) *Attorney, Agent, or Firm*—Edwin D. Schindler

(57) ABSTRACT

A motorcycle foot peg having a body portion adapted to bear the weight of a rider. The body portion is partially rotatable about a shaft, which is connected to the frame of the motorcycle. When in use, the angular position of the body portion of the foot peg can vary, so as to present a surface on which the rider's foot makes contact with a substantial portion of the surface of the body portion, not-withstanding the angle of the foot relative to the motorcycle frame.

22 Claims, 2 Drawing Sheets

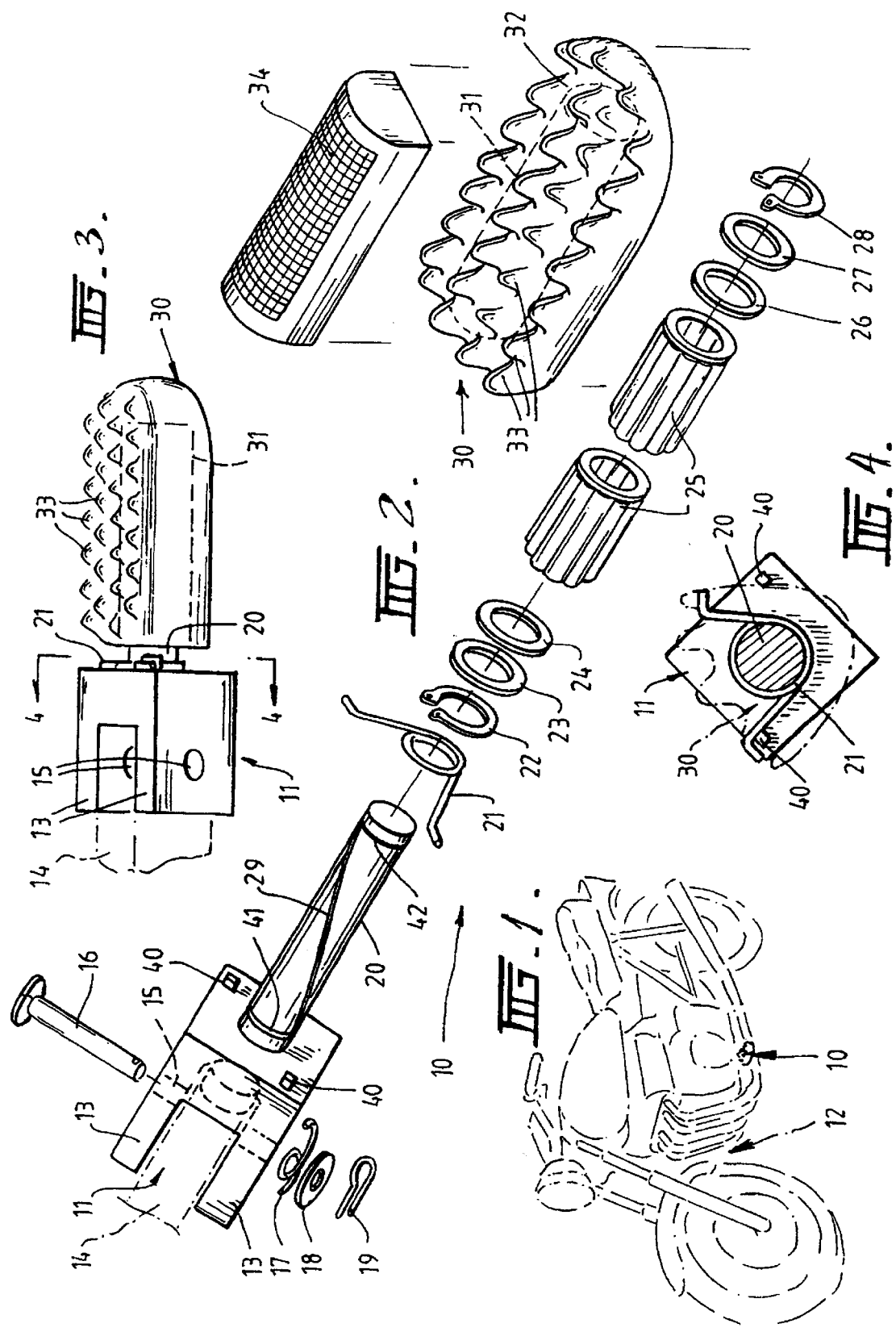

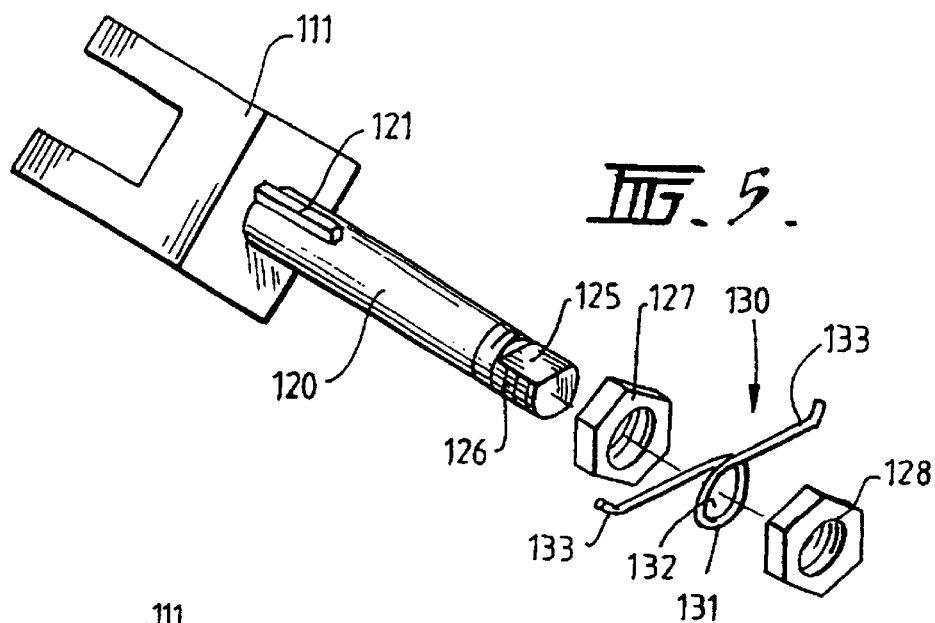
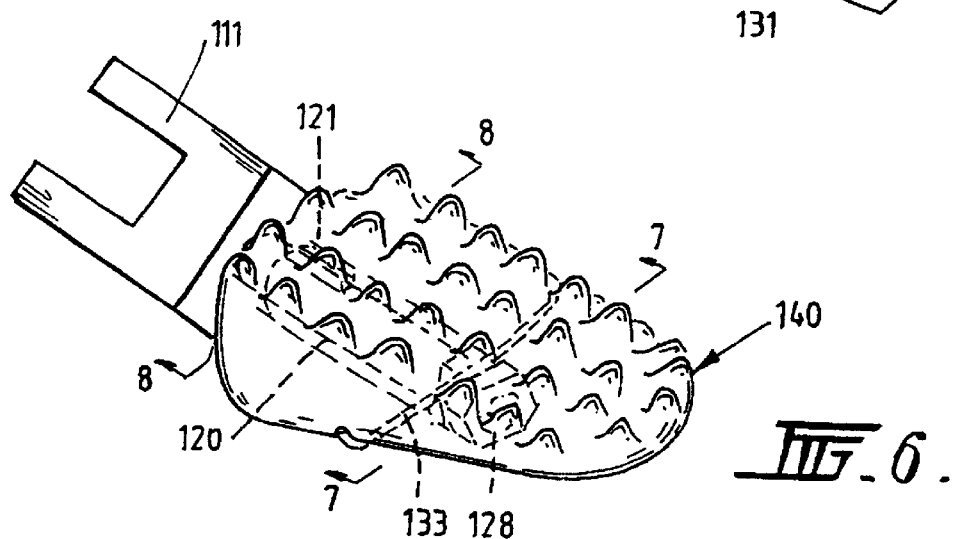
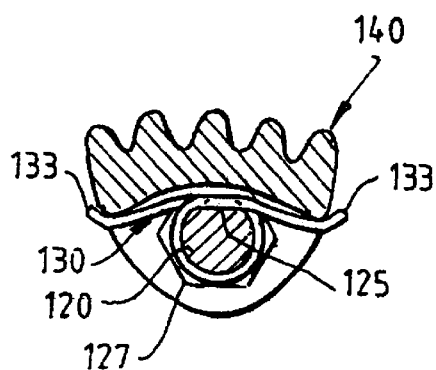 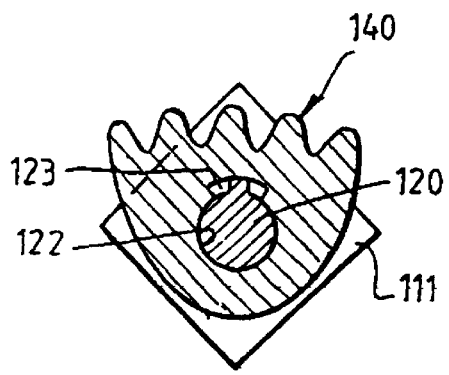

MOTORCYCLE PIVOTING FOOT PEGS

BACKGROUND OF THE INVENTION

1. Technical Field of the Invention

This invention relates to motorcycles and more particularly to an improvement in foot pegs for motorcycles. In this specification, reference to motorcycles includes both two and three wheeled motorcycles and also four wheeled all terrain vehicles which are ridden in a manner similar to motor cycles.

2. Description of the Prior Art

As is well known, most motorcycle assemblies include a frame having a seat on which a rider sits in a straddle fashion. A pair of foot pegs are carried at the lower end of the frame at opposite sides thereof for the rider to place his feet when riding. Frequently, controls for operating certain components of the motor cycle, such as a rear wheel brake or gear shift, are located in close proximity to the foot pegs. This allows the operator to foot activate the said controls when desirable.

It is common for motorcycle foot pegs to vary in appearance depending on intended application. Overall their basic design remains the same, that is they provide an inert projection in an appropriate position for the support of the rider's feet.

The design of the conventional motorcycle foot peg has some inherent disadvantages.

For example, motorcycle foot pegs that are built for off-road use are made with an aggressive tooth design to help the rider's feet grip the foot pegs in all conditions. Frequently, however, the grip points of the foot pegs fail to remain in constant contact with the maximum possible surface area of the rider's feet. For example when the vehicle encounters uneven conditions, and/or the rider moves to a body position where the angle of the feet, in particular the sole, becomes lesser or greater than the angle of the foot peg. When this occurs, part of the foot is moved away from the foot peg. This grip reduction is also experienced any time the rider's foot has to move to operate a foot control.

Furthermore, current manufacturing designs recognise, in some applications, the need for wider foot pegs to help distribute the load placed on the operators feet during high impact situations. But again, unless the angle of the foot is correct relative to the angle of the surface of the foot peg the load cannot be absorbed and distributed evenly across the entire surface of the foot peg which can result in loss of footing and control.

It is a principal object of this invention to provide an improved foot peg for motorcycles.

It is a further object of this invention to provide a foot peg for motorcycles that increases operator surefootedness and control.

SUMMARY OF THE INVENTION

The invention, in its broadest aspect includes a foot peg for a motorcycle which has a body portion the upper surface of which is adapted to receive a rider's foot, the body portion having an aperture passing through at least a substantial part of the length thereof, a mount adapted to be connected to the frame of a motorcycle, a shaft extending outwardly from the mount and adapted to receive the body thereover whereby the body can rotate about the axis of the shaft.

The invention provides a foot peg for motorcycles that assists the motorcycle riders to attain any desired body position in a swift, controlled and fluent manner. This is most desirable because the rider's body position determines the centre of gravity and the weight bias on a certain area of the motorcycle which radically effects it's handling and grip. This extra assistance helps the operator to conserve energy and reduce fatigue and therefore retain a higher level of concentration.

BRIEF DESCRIPTION OF THE DRAWING FIGURES

In order that the invention can be more readily understood, I will describe, by way of illustration, and in relation to the accompanying drawings, two embodiments of the invention.

In these drawings:

FIG. 1 shows a perspective view of a first embodiment of the foot peg affixed to part of the frame of a motorcycle;

FIG. 2 shows an exploded view of the foot peg of FIG. 1;

FIG. 3 is a side view of the foot peg of FIGS. 1 and 2;

FIG. 4 is a section along line 4—4 of FIG. 2;

FIG. 5 is a perspective view of a second form of foot peg;

FIG. 6 is a partial exploded view of this embodiment;

FIG. 7 is a section along line 7—7 of FIG. 5; and

FIG. 8 is a section along line 8—8 of FIG. 5.

DETAILED DESCRIPTION OF THE DRAWING FIGURES AND PREFERRED EMBODIMENTS

The embodiment of FIGS. 1 to 4 show a foot peg assembly 10 which basically has a mount 11 which can be shaped to be received on part of the motorcycle 12 frame. These mounts will be largely specific to particular types of motorcycles but there may also be a generic mount.

As shown in FIG. 2, the mount can have two arms 13 which are adapted to be located on either side of a component 14 of the motorcycle and there are apertures 15 through the arms 13 and the portion 14 which are adapted to receive a retaining pin 16 which can be provided with a spring washer 17, a standard washer 18 and a split pin 19.

If required the mount could be held to the motorcycle by way of bolts or the like. Extending from the mount there is at foot peg shaft 20 which, as illustrated, has a return spring 21i a circlip 22, a washer 23, a seal 24, a pair of bearings 25, a further seal 26, washer 27 and circlip 28.

The shaft 20 may have a grease groove 29 passing thereover.

The foot peg body 30 has a central aperture 31 therethrough which aperture is designed to receive the shaft 20 and bearing assembly 25 as will be described. It has an upper surface 32 which, as illustrated, has some relatively aggresive pertruberance 33.

The form these take will depend on the use which is to be made of the motorcycle. If the cycle is basically to be used on the road and in benign conditions, then the pertruberance simply need to be sufficient to enable a good grip under those circumstances. If the motorcycle is to be used off road and under, say, competition conditions, pertruberances 33 similar to those illustrated may be preferred.

I can provide a rubber insert 34 which can be placed over the peg body 30 when the motorcycle is being used in a more leisurely way.

On assembly, the return spring 21 is first positioned over the shaft 20 and will be constrained between the peg body 30 and lugs 40 on the mount 11.

The needle bearings 25 together with their associated oil seals 24, 26 and washers 23, 27 can be fitted within or adjacent to the ends of the peg body 30.

A circlip 22 enters groove 41 and this restricts inward movement of the assembly of the bearings and the peg body 30 and after this is located a circlip 28 is connected into groove 42 to retain the assembly in position.

The embodiment of FIGS. 5 to 8 is basically generally similar in form to that of the earlier embodiment but differs in certain aspects.

In this case, the mount 111 is provided with a shaft 120 which on its inner end is provided with a key 121 which may be let into the shaft and which may be formed as part of the formation of the shaft.

The aperture 122 in the foot peg body 140 is provided with a recess 123 which has a length approximately the same as the key 121 and an angular length sufficient to provide the required movement of the body relative to the shaft but to act as a stop when the key strikes the ends of the recess 123.

At its outer end the shaft has a flat portion 125 which has a thread 126 and in this arrangement, a lock nut 127 can pass over the thread 126, a spring 130 which can have a body 131 which has a central aperture 132 adapted to pass over the flat 125 on the shaft so the centre of the spring is prevented from rotation and has a pair of arms 133 extending therefrom as will be described hereinafter.

After the footpeg body 140 is located, the spring 130 is placed into position and a further nut 128 is tightened over the thread 126.

The two arms 133 may have deformed outer ends, as can be seen in FIG. 7, which can lie around or under the forward and rearward extremities of the peg body.

As can be seen from FIG. 7, the spring provides a resistance to rotation of the body as on each direction of rotation one of the leaves of the spring will be deformed so there is a generally biasing action to bring the body 140 to a central position.

The recess 123 and the key 121, as previously described act as limits on the rotational movement of the body relative to the shaft.

In operation, both embodiments effectively act in the same manner. In each case the peg body is normally held in a central, normal position, and on straight ahead riding, the rider's feet rest on the pegs in this position.

However, when the rider needs to move a body or foot position, the body when approaching obstacles when riding or under extreme cornering or the like, or the foot when used to change gears or to operate a foot brake, the body of the peg is permitted to rotate so that the sole of the rider's boot remains in contact with effectively the whole of the peg body during the manouvre. That is, there is no loss of grip on the peg when it is necessary that stability be achieved as far as the rider is concerned.

As soon as the manouvre is completed, then there will be a movement under bias of the body back to its central position which will be achieved.

It will be that problems associated with conventional motorcycle foot pegs are overcome or minimised by the present invention which provides a convenient, durable motorcycle foot peg, that will by design, pivot both forward and backward by means of direct pressure from the rider's foot. This pivoting action allows the entire surface of the foot peg to track with the motion of the operators foot. This ensures that maximum possible contact of the grip points is achieved.

This foot peg pivoting action also allows the operator to change riding positions in a more controlled, fluent manner whilst maintaining greater surefootedness.

This foot peg pivoting action also aids the operator in the usage of foot controls, i.e. rear brake and gear shift.

Additionally as the motorcycle encounters uneven conditions, causing the front and rear of the motorcycle to go up and down alternatively, the pivoting action of the foot peg allows the motorcycle to rock under the rider on the axis of the foot pegs so the entire surface of the foot peg again remains in constant contact with the underside of the riders foot, therefore achieving maximum possible grip and load distribution.

Whilst I have described herein two particular embodiments of the invention, it is to be understood that the mechanical arrangement used is one of preferment, not one of limitation, and the mechanical arrangements, the size of the peg body, the formation of the protrusions, can all be varied without departing from the scope of the invention.

I claim:

1. A foot peg for a motorcycle, comprising:
    a mount connectable to a frame of a motorcycle having a shaft extending therefrom;
    a body for receiving a foot of a rider, said body being rotatably connected to said shaft;
    means for biasing rotational position of said body relative to said shaft toward a preferred rotational position; and,
    rotation limiting means for limiting an angle of rotation of said body relative to said shaft, said rotation limiting means including a pair of stops associated with said body, so that engagement of one stop of said pair of stops by said body limits rotational movement of said body relative to said shaft.

2. The foot peg for a motorcycle according to claim 1, wherein said mount includes a lug, so that engagement of one stop of said pair of stops by said lug limits rotational movement of said body relative to said shaft.

3. The foot peg for a motorcycle according to claim 2, wherein said body includes an elongated aperture for receiving the lug associated with said mount, with each end of the elongated aperture defining one stop of said pair of stops associated with said body.

4. The foot peg for a motorcycle according to claim 1, wherein said means for biassing rotational position includes a spring having a coil passing around said shaft and having terminating end portions extending from said coil, said mount holding a first terminating end of said terminating end portions, in position, while said body engages a second terminating end of said terminating end portions, so that rotation of said body relative to said shaft causes said spring to store potential energy for urging said body to return toward a preferred location.

5. The foot peg for a motorcycle according to claim 4, wherein said angle of rotation is less than 60°.

6. The foot peg for a motorcycle according to claim 5, wherein said angle of rotation of said body to said shaft either side of the preferred location is less than 30°.

7. The foot peg for a motorcycle according to claim 4, wherein said spring is a helical torsion spring.

8. The foot peg for a motorcycle according to claim 4, wherein said spring is a leaf spring.

9. The foot peg for a motorcycle according to claim 1, wherein said body includes an upper surface having a substantially planar position.

10. The foot peg for a motorcycle according to claim 9, wherein said substantially planar portion of said upper surface includes a plurality of protuberances.

11. A motorcycle, comprising:

a frame; and, two foot pegs, each foot peg of said two foot pegs including:
- a mount connectable to said frame of said motorcycle having a shaft extending therefrom;
- a body for receiving a foot of a rider, said body being rotatably connected to said shaft;
- means for biassing rotational position of said body relative to said shaft towards a preferred, rotational position; and,
- rotation limiting means for limiting an angle of rotation of said body relative to said shaft, said rotation limiting means including a pair of stops associated with said body, so that engagement of one stop of said pair of stops by said body limits rotational movement of said body relative to said shaft.

12. The motorcycle according to claim 11, wherein said mount of each said foot peg includes a lug, so that engagement of one stop of said pair of stops by said lug limits rotational movement of said body relative to said shaft.

13. The motorcycle according to claim 12, wherein said body includes an elongated aperture for receiving the lug associated with said mount, with each end of the elongated aperture defining one stop of said pair of stops associated with said body.

14. The motorcycle according to claim 11, wherein said means for biassing rotational position includes a spring having a coil passing around said shaft and having terminating end portions extending from said coil, said mount holding a first terminating end of said terminating end portions, in position, while said body engages a second terminating end of said terminating end portions, so that rotation of said body relative to said shaft causes said spring to store potential energy for urging said body to return toward the preferred rotational position.

15. A foot peg for a motorcycle, comprising:
- a body portion having an upper surface for receiving a rider's foot and an aperture passing through a substantial portion of the length of said body portion;
- a mount connected to a frame of a motorcycle; and,
- a shaft extending outwardly from said mount for receiving the body portion over said shaft, said body portion being rotatable in each of two opposing directions about, and relative to, a longitudinal axis of said shaft, said shaft having a key extending partway along the length of said shaft with the aperture in said body portion having a longitudinal recess cooperable with said key, whereby rotational movement of said body portion relative to said shaft is limited by the width of said longitudinal recess relative to the width of said key, said shaft further including means for permitting a rider to position and re-position, during motion while riding the motorcycle, said upper surface of said body portion as so desired.

16. The foot peg for a motorcycle according to claim 15, wherein said upper surface of said body portion includes a substantially planar portion.

17. The foot peg for a motorcycle according to claim 16, wherein said substantially planar portion of said upper surface includes a plurality of pertruberances.

18. The foot peg for a motorcycle according to claim 15, wherein said key is formed on said shaft adjacent to a point of connection with said mount, said key being further positioned so that said key is in the aperture of said body portion.

19. The foot peg for a motorcycle according to claim 15, further comprising means for biassing said body portion to a preferred location relative to said shaft.

20. The foot peg for a motorcycle according to claim 19, wherein said means for biassing said body portion is a helical spring positioned around said shaft.

21. The foot peg for a motorcycle according to claim 19, wherein said means for biassing said body portion is a leaf spring extending outwardly,from at least one said of said shaft.

22. The foot peg for a motorcycle according to claim 15, wherein said body portion-is rotatable through a substantially equal angle of rotation in each of said two opposing directions relative to said shaft.

* * * * *